United States Patent
Hsieh (10) Patent No.: US 11,290,898 B2
(45) Date of Patent: Mar. 29, 2022

(54) COMMUNICATION APPARATUS AND TEST METHOD THEREOF

(71) Applicant: PEGATRON CORPORATION, Taipei (TW)

(72) Inventor: Chia-Han Hsieh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 70 days.

(21) Appl. No.: 16/992,049

(22) Filed: Aug. 12, 2020

(65) Prior Publication Data
US 2021/0092620 A1  Mar. 25, 2021

(30) Foreign Application Priority Data

Sep. 25, 2019 (TW) .................................. 108134559

(51) Int. Cl.
*H04W 24/06* (2009.01)
*H04W 48/16* (2009.01)
(Continued)

(52) U.S. Cl.
CPC .......... *H04W 24/06* (2013.01); *H04W 48/16* (2013.01); *H04W 72/0453* (2013.01); *H04W 84/22* (2013.01)

(58) Field of Classification Search
CPC ..... H04W 24/00; H04W 24/06; H04W 24/08; H04W 48/16; H04W 72/044;
(Continued)

(56) References Cited

U.S. PATENT DOCUMENTS

| 2006/0040654 A1* | 2/2006 | Moore | H04W 24/00 |
| | | | 455/423 |
| 2006/0186893 A1* | 8/2006 | Schmidt | H04W 24/00 |
| | | | 324/602 |

(Continued)

FOREIGN PATENT DOCUMENTS

KR  20130073865  7/2013

OTHER PUBLICATIONS

"Search Report of Europe Counterpart Application", dated Feb. 16, 2021, p. 1-p. 29.

(Continued)

*Primary Examiner* — Siu M Lee
(74) *Attorney, Agent, or Firm* — J.C. Patents (57) ABSTRACT

A communication apparatus and a test method thereof are provided. The communication apparatus includes a wireless communication module, a wireless driver and an application unit. The test method of the communication apparatus includes the following steps: after the communication apparatus performs a booting operation, setting an operation mode as a default mode by the wireless driver to activate a first wireless interface and a second wireless interface of the wireless communication module, and controlling the wireless communication module by the wireless driver to not transmit a wireless signal. The test method further includes re-setting the operation mode according to a test item, by the application unit when the application unit receives an execution command, so that the wireless driver controls the wireless communication module to transmit the wireless signal corresponding to the operation mode.

14 Claims, 4 Drawing Sheets

(51) Int. Cl.
*H04W 72/04* (2009.01)
*H04W 84/22* (2009.01)

(58) Field of Classification Search
CPC . H04W 72/0453; H04W 84/12; H04W 84/22; H04W 88/02; H04W 88/04; H04W 88/06; G06F 11/26; G06F 9/4411; H04L 69/321
See application file for complete search history.

(56) References Cited

U.S. PATENT DOCUMENTS

| | | | |
|---|---|---|---|
| 2008/0293363 A1* | 11/2008 | Olgaard | H04B 17/0085 455/67.7 |
| 2012/0207030 A1* | 8/2012 | Luong | H04W 24/06 370/245 |
| 2016/0233902 A1 | 8/2016 | Choudhary et al. | |
| 2018/0084591 A1 | 3/2018 | Patel et al. | |
| 2018/0249111 A1 | 8/2018 | Kim et al. | |
| 2019/0254092 A1 | 8/2019 | Perrufel et al. | |

OTHER PUBLICATIONS

"Office Action of Korea Counterpart Application", dated Apr. 16, 2021, with English translation thereof, pp. 1-13.

* cited by examiner

COMMUNICATION APPARATUS AND TEST METHOD THEREOF

CROSS-REFERENCE TO RELATED APPLICATION

This application claims the priority benefit of Taiwan application serial no. 108134559, filed on Sep. 25, 2019. The entirety of the above-mentioned patent application is hereby incorporated by reference herein and made a part of this specification.

BACKGROUND

Technology Field

The invention relates to a test method, and particularly relates to a test method with high efficiency and a communication apparatus using the test method.

Description of Related Art

The communication apparatus nowadays is usually provided with a WiFi module, and such WiFi module is normally compatible with a real simultaneous dual band (RSDB) mode and a non-RSDB mode. Also, before the communication apparatus is shipped out of factory, the RSDB mode and the non-RSDB mode of the WiFi module needs to be tested to ensure the WiFi module functions properly in these modes.

In the conventional test process, if the mode under test (e.g., the RSDB mode) of the WiFi module is different from the default mode (e.g., the non-RSDB mode) of the WiFi module, the communication apparatus needs to be booted and stays at the bootloader stage in the booting process of the communication apparatus. Then, the data in the non-volatile memory of the communication apparatus is removed. The data in the non-volatile memory include various default parameters (e.g., the default mode and corresponding operation parameters) of the WiFi module. Then, the communication apparatus is rebooted, and the setting values of the mode under test of the WiFi module and the corresponding operation parameters are written into the non-volatile memory. Afterwards, the communication apparatus is rebooted again so that the communication apparatus may set up the WiFi module according to the setting values and the corresponding operation parameters in the non-volatile memory during this booting process, and thus the WiFi module may transmit service set identifiers (SSID) and perform data transmission after the communication apparatus is booted. At this time, a test device may conduct a test on the WiFi module. Since the communication apparatus may require three booting operations to switch the mode of the WiFi module to the mode under test (e.g., switching from the RSDB mode to the non-RSDB mode), such a procedure not only prolongs the whole test, but also complicates the test process.

Besides, since the WiFi module starts sending WiFi signals (e.g., SSID) after being booted, when multiple communication apparatuses are being tested on the production line, the WiFi signals transmitted by the WiFi modules of these communication apparatuses may affect each other. Besides, it is also difficult for the test device to identify which communication apparatus transmits the WiFi signal that has been received. As a result, a test error may arise.

SUMMARY

The embodiments of the invention provide a communication apparatus and a test method thereof capable of reducing the overall test time, simplifying a test process, and reducing test errors.

A communication apparatus according to an embodiment of the invention includes a wireless communication module, a wireless driver and an application unit. The wireless communication module is configured to transmit a wireless signal. The wireless driver is coupled to the wireless communication module and is configured to control the wireless communication module. After the communication apparatus performs a booting operation, the wireless driver sets an operation mode as a default mode to activate a first wireless interface and a second wireless interface of the wireless communication module and controls the wireless communication module to not transmit the wireless signal. The application unit is coupled to the wireless driver and configured to reset the operation mode according to a test item when receiving an execution command, so that the wireless driver controls the wireless communication module to transmit the wireless signal corresponding to the operation mode.

A test method for a communication apparatus according to an embodiment includes the following steps: after the communication apparatus performs a booting operation, setting, by a wireless driver, an operation mode as a default mode of the communication apparatus to activate a first wireless interface and a second wireless interface of the wireless communication module, and controlling, by a wireless driver, the wireless communication module of the communication apparatus to not transmit a wireless signal; and re-setting, by the application unit, the operation mode according to a test item when the application unit receives an execution command, so that the wireless driver controls the wireless communication module to transmit the wireless signal corresponding to the operation mode.

Based on the above, in the communication apparatus and the test method thereof according to the embodiments of the invention, since the wireless communication module of the communication apparatus does not transmit a wireless communication signal before being tested, the wireless communication module can prevent the test results of other communication devices undergoing a wireless signal test operation from being affected, thereby preventing a test error from happening. Besides, the communication apparatus only needs to be booted once, and the application unit executes the test item to switch the operation mode executed by the wireless driver to a mode to be tested. Accordingly, an external test device may test the wireless signal transmitted by the wireless communication module under various modes, thereby significantly reducing the overall test time of the wireless communication module and simplifying the test process.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
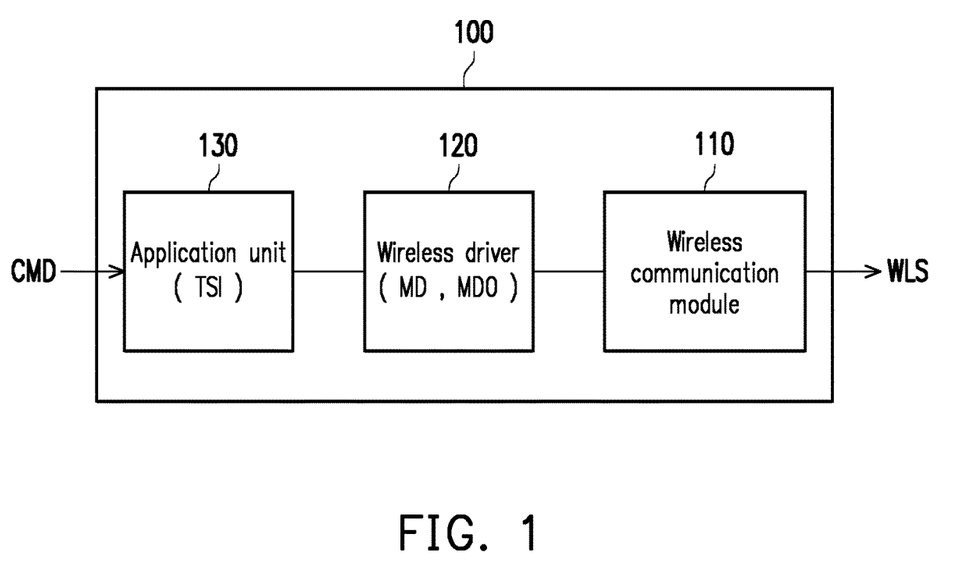
FIG. 1 is a schematic block diagram illustrating a communication apparatus according to an embodiment of the invention.

FIG. 1 is a schematic block diagram illustrating a communication apparatus according to an embodiment of the invention. Referring to FIG. 1, a communication apparatus 100 of the embodiment may be, for example, an access point (AP). However, the invention is not limited thereto. The communication apparatus 100 may include a wireless communication module 110, a wireless driver 120, and an application unit 130. However, the invention is not limited thereto. The wireless communication module 110 is configured to transmit a wireless signal WLS. According to an embodiment of the invention, the wireless communication module 110 may be, for example, a WiFi module, and is compatible with a real simultaneous dual band (RSDB) mode and a non-RSDB mode. However, the invention is not limited thereto.

The wireless driver 120 is coupled to the wireless communication module 110 and is configured to control the wireless communication module 110. After the communication apparatus 110 performs a booting operation, the wireless driver 120 may set an operation mode MD as a default mode MDO and control the wireless communication module 110 to not transmit the wireless signal WLS.

According to an embodiment of the invention, the wireless driver 120 may be implemented as hardware, firmware, or a combination of hardware and firmware. If the wireless driver 120 is implemented as hardware, the wireless driver 120 may be realized as a micro controller. However, the invention is not limited thereto.

According to an embodiment of the invention, the wireless signal WLS may include a service set identifier (SSID). However, the invention is not limited thereto.

According to an embodiment of the invention, the default mode MDO may be the RSDB mode. Therefore, after the communication apparatus 100 performs the booting operation, the wireless driver 120 may directly set the operation mode MD as the RSDB mode (i.e., the default mode MDO). However, the invention is not limited thereto and such setting is dependent upon the application or design needs. According to another embodiment of the invention, the default mode MDO may be the non-RSDB mode. Therefore, after the communication apparatus 100 performs the booting operation, the wireless driver 120 may directly set the operation mode MD as the non-RSDB mode.

The application unit 130 is coupled to the wireless driver 120 and is configured to reset the operation mode MD executed by the wireless driver 120 according to a test item TSI when the application unit 130 receives an execution command CMD, so that the wireless communication module 110 transmits the wireless signal WLS corresponding to the operation mode MD.

In an embodiment of the invention, the application unit 130 may be, for example, software, a central processing unit (CPU) or other programmable general-purpose or special-purpose microprocessors, digital signal processors (DSPs), programmable controllers, application specific integrated circuits (ASICs), other similar components, or a combination thereof. However, the invention is not limited thereto.

Figure 2:
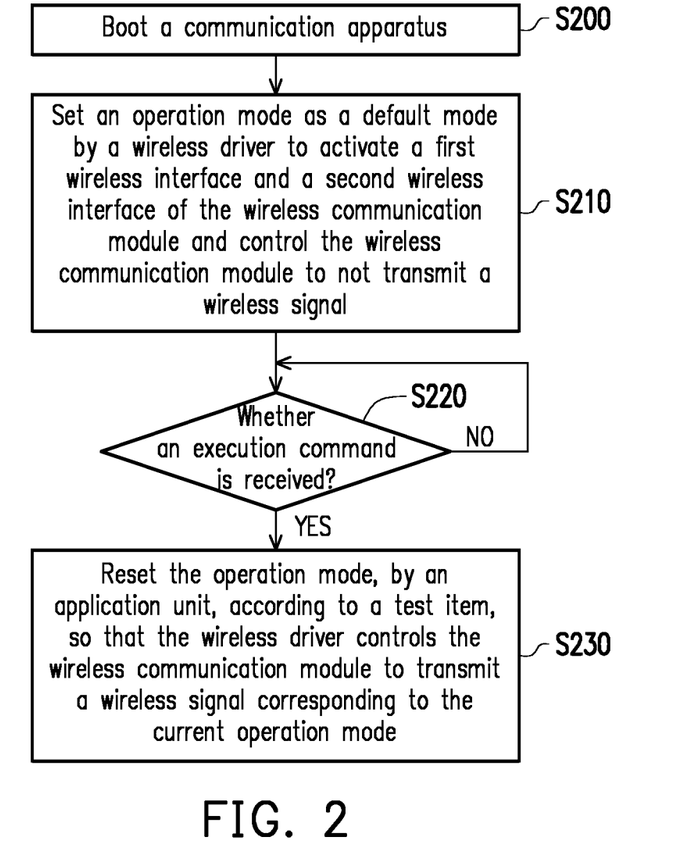
FIG. 2 is a flowchart illustrating a test method according to an embodiment of the invention.

A test method of the communication apparatus 100 will be described in the following. FIG. 2 is a flowchart illustrating a test method according to an embodiment of the invention, and the test method may be used in the communication apparatus 100 of FIG. 1. Referring to FIGS. 1 and 2, the test method according to this exemplary embodiment includes steps as follows. First of all, in Step S200, the communication apparatus 100 is booted. After the communication apparatus 100 performs a booting operation, in Step S210, the wireless driver 120 sets the operation mode MD as the default mode MDO to activate a first wireless interface and a second wireless interface of the wireless communication module 110 and controls the wireless communication module 110 to not transmit the wireless signal WLS.

Then, in Step S220, the application unit 130 determines whether an execution command CMD is received. If it is determined in Step S220 that the execution command CMD is received, the wireless communication module 110 is to be tested. Accordingly, in Step S230, the application unit 130 resets the operation mode MD according to the test item TSI, so that the wireless communication module 110 transmits the wireless signal WLS corresponding to the current operation mode MD. If it is determined in Step S220 that the execution command CMD is not received, the flow stays at Step S220 to wait for reception of the execution command CMD.

Since the wireless communication module 110 does not transmit the wireless communication signal WLS before being tested, the wireless communication module 110 can prevent other communication devices undergoing a wireless signal test from being affected, thereby preventing a test error from happening.

In addition, since the application unit 130 resets the operation mode MD executed by the wireless driver 120 according to the test item TSI, after the communication apparatus 100 has finished the booting operation, the application unit 130 may dynamically switch the operation mode MD executed by the wireless driver 120 according to the test item TSI, so that the wireless communication module 110 transmits the wireless signal WLS corresponding to different operation modes MD, thereby realizing testing on the wireless communication module 110 under different operation modes MD. Accordingly, the communication apparatus 100 only needs to be booted once, and the application unit 130 executes the test item TSI to switch the operation mode MD executed by the wireless driver 120 to a mode to be tested. Accordingly, an external test device may test the wireless signal WLS transmitted by the wireless communication module 110 under various modes, thereby significantly reducing the overall test time of the wireless communication module 110 and simplifying the test process.

Figure 3:
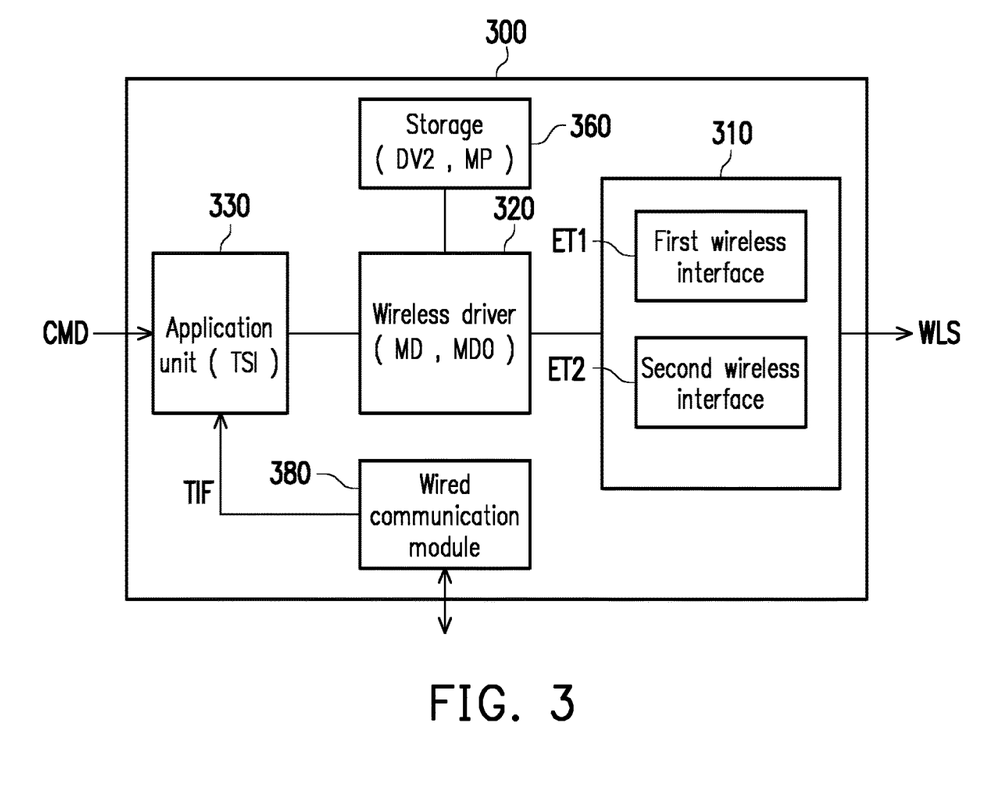
FIG. 3 is a schematic block diagram illustrating a communication apparatus according to another embodiment of the invention.

FIG. 3 is a schematic block diagram illustrating a communication apparatus according to another embodiment of the invention. Referring to FIG. 3, a communication apparatus 300 may include a wireless communication module 310, a wireless driver 320, and an application unit 330, a storage device 360, and a wired communication module 380.

However, the invention is not limited thereto. The embodiments and the operations of the wireless communication module 310, the wireless driver 320, and the application unit 330 shown in FIG. 3 are similar to the embodiments and the operations of the wireless communication module 110, the wireless driver 120, and the application unit 130, so the details of these components can be referred to the aforementioned descriptions about FIG. 1.

In addition, in this embodiment, the wireless communication module 310 may include a first wireless interface ET1 and a second wireless interface ET2. When the wireless driver 320 executes the RSDB mode (i.e., the default mode MDO), the first wireless interface ET1 and the second wireless interface ET2 of the wireless communication module are activated. The first wireless interface ET1 and the second wireless interface ET2 are conventional hardware interface circuits, which comply with the WiFi communication standard. The first wireless interface ET1 serves to transmit and receive signals in a frequency band of 2.4 GHz, and the second wireless interface ET2 serves to transmit and receive signals in a frequency band of 5 GHz.

The storage device 360 is coupled to the wireless driver 320 and is configured to store a default value DV2 and at least one operation parameter MP corresponding to the default value DV2. However, the invention is not limited thereto. Specifically, the default value DV2 and the operation parameter MP are stored in the storage device 360 in advance. According to an embodiment of the invention, the storage device 360 may be implemented by a non-volatile random access memory (NVRAM). However, the invention is not limited thereto. According to an embodiment of the invention, the default value DV2 corresponds to the RSDB mode or the non-RSDB mode. However, the invention is not limited thereto and is dependent upon the application or design needs.

The wired communication module 380 is coupled to the application unit 330 and is configured for wired signal transmission with other electronic apparatuses. According to an embodiment of the invention, the wired communication module 380 may be, for example, an Ethernet module. However, the invention is not limited thereto.

Figure 4:
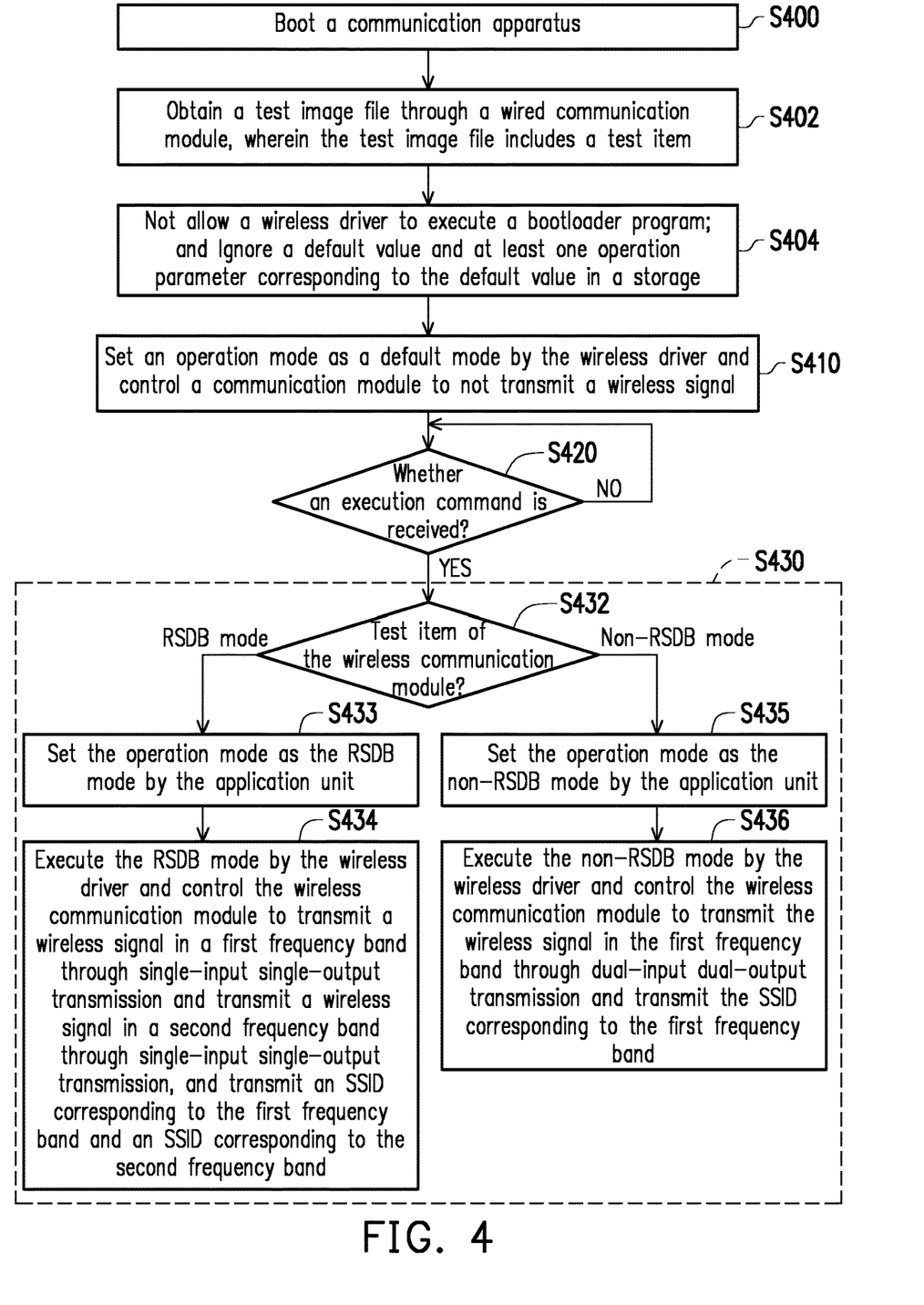
FIG. 4 is a flowchart illustrating a test method according to another embodiment of the invention.

A test method of the communication apparatus 300 will be described as follows. FIG. 4 is a flowchart illustrating a test method according to another embodiment of the invention, and the test method may be used in the communication apparatus 300 of FIG. 3. Referring to FIGS. 3 and 4, the test method according to this exemplary embodiment includes the following steps. First of all, in Step S400, the communication apparatus 300 is booted. Then, in Step S402, a test image file TIF is obtained through the wired communication module 380. The test image file TIF includes the test item TSI. According to an embodiment of the invention, the wired communication module 380 may, for example, download the test image file TIF from an external test device. However, the invention is not limited thereto. According to an embodiment of the invention, the test image file TIF may also include a parameter value related to the default mode MDO. However, the invention is not limited thereto.

After the communication apparatus 300 performs the booting operation, in Step S404, the wireless driver 320 does not execute the bootloader program and ignores the default value DV2 and the at least one operation parameter MP corresponding to the default value DV2 in the storage device 360. Specifically, after the communication apparatus 300 of the invention performs the booting operation, the communication apparatus 300 does not execute the bootloader program. Therefore, the communication apparatus 300 does not read the default value DV2 and the at least one operation parameter MP corresponding to the default value DV2 from the storage device 360. Since it is not necessary to read the default value DV2 and the at least one operation parameter MP corresponding to the second default value DV2 from the storage device 360, the storage device 360 does not have to be cleared after the communication apparatus 300 of the invention performs the booting operation.

Then, in Step S410, the wireless driver 320 may set the operation mode MD as the default mode MDO and control the wireless communication module 310 to not transmit the wireless signal WLS. Specifically, in Step S410, when the operation mode of the wireless driver 320 is directly set to the RSDB mode, the wireless driver 320 setups the first wireless interface ET1 and the second wireless interface ET2 of the wireless communication module 310, so that before the wireless communication module 310 starts being tested, the first wireless interface does not transmit the SSID corresponding to the first frequency band and the second wireless interface ET2 does not transmit the SSID corresponding to the second frequency band. Accordingly, other wireless communication apparatuses undergoing the wireless signal test operation can avoid being affected. According to an embodiment of the invention, the first frequency band is a frequency band of 2.4 GHz, and the second frequency band is a frequency band of 5 GHz, for example. However, the invention is not limited thereto.

Then, in Step S420, the application unit 330 determines whether the execution command CMD is received. If it is determined in Step S420 that the execution command CMD is received, the wireless communication module 310 is to be tested. Accordingly, in Step S430, the application unit 330 resets the operation mode MD according to the test item TSI, so that the wireless communication module 310 transmits the wireless signal WLS corresponding to the operation mode MD. If it is determined in Step S420 that the execution command CMD is not received, the flow stays at Step S420 to wait for reception of the execution command CMD.

Specifically, Step S430 includes the details of Steps S432 and S436. First of all, in Step S432, the application unit 330 determines the test item of the wireless communication module 310 according to the test item TSI. If the test item of the wireless communication module 310 is related to the RSDB mode, that is, the test item of the wireless communication module 310 is a test of the RSDB mode, Step S433 is performed. In Step S433, the application unit 330 sets the operation mode MD as the RSDB mode. Then, in Step S434, the wireless driver 320 executes the RSDB mode, and controls the wireless communication module 310 to transmit the wireless signal WLS in the first frequency band through single input single output transmission, and transmit the wireless signal WLS in the second frequency band through single input single output transmission, and the wireless driver 320 transmits an SSID corresponding to the first frequency band and an SSID corresponding to the second frequency band.

Specifically, in Step S434, the wireless driver 320 may control the first wireless interface ET1 to transmit the SSID corresponding to the first frequency band and transmit the wireless signal of the first frequency band through single input single output transmission, and the wireless driver 320 may control the second wireless interface ET2 to transmit the SSID corresponding to the second frequency band and transmit the wireless signal of the second frequency band through single input single output transmission. In this way, the external test device is able to test the signal intensity and transmission throughput of the wireless communication module 310 under the RSDB mode according to the detected wireless signal.

In contrast, if the test item of the wireless communication module 310 is related to the non-RSDB mode, that is, the test item of the wireless communication module 310 is a test of the non-RSDB mode, Step S435 is performed. In Step S435, the application unit 330 sets the operation mode MD as the non-RSDB mode. Then, in Step S436, the wireless driver 320 executes the non-RSDB mode and controls the wireless communication module 310 to transmit the wireless signal WSL in the first frequency band through dual-input dual-output transmission and the wireless driver 320 transmits an SSID corresponding to the first frequency band.

Specifically, in Step S436, the wireless driver 320 may control the first wireless interface ET1 to transmit the SSID corresponding to the first frequency band and transmit the wireless signal in the first frequency band through dual-input dual-output transmission. In this way, the external test device is able to test the signal intensity and transmission throughput of the wireless communication module 310 under the non-RSDB mode according to the detected wireless signal. It is noted here that the second wireless interface ET2 does not transmit the wireless signal under the non-RSDB mode.

Since the wireless communication module 310 does not transmit the wireless communication signal WLS before being tested, the wireless communication module 110 can prevent the test results of other communication devices undergoing a wireless signal test from being affected, thereby preventing a test error from happening.

Besides, according to the embodiment the wireless driver 320 does not set or reset the operation mode MD according to the default value DV2 stored in the storage 360. Instead, the application unit 330 resets the operation mode MD executed by the wireless driver 320 according to the test item TSI. Therefore, the application unit 330 may dynamically switch the operation mode MD executed by the wireless driver 320 according to the test item TSI, so that the wireless communication module 310 transmits the wireless signal WLS corresponding to different operation modes MD, thereby realizing testing on the wireless communication module 310 under different operation modes MD. Accordingly, compared with the conventional communication apparatus requiring multiple booting operations to switch the mode of the wireless communication module to the mode to be tested, the communication apparatus 300 in the embodiment only needs to be booted once, and the application unit 330 executes the test item TSI to switch the operation mode MD executed by the wireless driver 320 to a mode to be tested. Accordingly, an external test device may test the wireless signal WLS transmitted by the wireless communication module 310 under various modes, thereby significantly reducing the overall test time of the wireless communication module 310 and simplifying the test process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A communication apparatus, comprising:
a wireless communication module, configured to transmit a wireless signal;
a wireless driver, coupled to the wireless communication module and configured to control the wireless communication module, wherein after the communication apparatus performs a booting operation, the wireless driver sets an operation mode as a default mode to activate a first wireless interface and a second wireless interface of the wireless communication module and controls the wireless communication module to not transmit the wireless signal; and
an application unit, coupled to the wireless driver and configured to reset the operation mode according to a test item when receiving an execution command so that the wireless driver controls the wireless communication module to transmit the wireless signal corresponding to the operation mode.

2. The communication apparatus as claimed in claim 1, further comprising:
a wired communication module, coupled to the application unit, wherein the communication apparatus obtains a test image file through the wired communication module, and the test image file comprises the test item.

3. The communication apparatus as claimed in claim 1, wherein after the communication apparatus performs the booting operation, the wireless driver does not execute a bootloader program and ignores a default value and at least one operation parameter corresponding to the default value in a storage device.

4. The communication apparatus as claimed in claim 3, wherein the default mode is a real simultaneous dual band (RSDB) mode, the default value corresponds to the RSDB mode or a non-RSDB mode.

5. The communication apparatus as claimed in claim 1, wherein the wireless signal comprises at least one service set identifier (SSID).

6. The communication apparatus as claimed in claim 5, wherein when the test item is related to a real simultaneous dual band (RSDB) mode, the wireless driver controls the first wireless interface of the wireless communication module to transmit the wireless signal in a first frequency band through single input single output transmission and controls the second wireless interface of the wireless communication module to transmit the wireless signal in a second frequency band through single input single output transmission, and transmits a service set identifier (SSID) corresponding to the first frequency band and an SSID corresponding to the second frequency band through the first wireless interface and the second wireless interface.

7. The communication apparatus as claimed in claim 5, wherein when the test item is related to a non-RSDB mode, the wireless driver controls the first wireless interface of the wireless communication module to transmit the wireless signal in a first frequency band through dual-input dual-output transmission and transmits an SSID corresponding to the first frequency band through the first wireless interface.

8. A test method for a communication apparatus, wherein the communication apparatus comprises a wireless communication module, a wireless driver, and an application unit, the test method comprising:
after the communication apparatus performs a booting operation, setting, by the wireless driver, an operation mode as a default mode to activate a first wireless interface and a second wireless interface of the wireless communication module, and controlling, by the wireless driver, the wireless communication module to not transmit a wireless signal; and
re-setting, by the application unit, the operation mode according to a test item when the application unit receives an execution command so that the wireless driver controls the wireless communication module to transmit the wireless signal corresponding to the operation mode.

9. The test method as claimed in claim 8, further comprising:
Obtaining, by the communication apparatus, a test image file through a wired communication module of the communication apparatus, wherein the test image file comprises the test item.

10. The test method as claimed in claim 8, further comprising:
after the communication apparatus performs the booting operation, not executing, by the wireless driver, a bootloader program and ignoring a default value and at least one operation parameter corresponding to the default value in a storage device.

11. The test method as claimed in claim 10, wherein the default mode is a real simultaneous dual band (RSDB) mode, the default value corresponds to the RSDB mode or a non-RSDB mode.

12. The test method as claimed in claim 8, wherein the wireless signal comprises at least one service set identifier (SSID).

13. The test method as claimed in claim 12, wherein the step of re-setting, by the wireless driver, the operation mode according to the test item when the application unit receives the execution command so that the wireless driver controls the wireless communication module to transmit the wireless signal corresponding to the operation mode comprises:
setting, by the application unit, the operation mode as a real simultaneous dual band (RSDB) mode when the test item is related to the RSDB mode; and
executing, by the wireless driver, the RSDB mode and controlling, by the wireless driver, the first wireless interface of the wireless communication module to transmit the wireless signal in a first frequency band through single input single output transmission and controlling, by the wireless driver, the second wireless interface of the wireless communication module to transmit the wireless signal in a second frequency band through single input single output transmission, and transmitting, by the wireless driver, a service set identifier (SSID) corresponding to the first frequency band and an SSID corresponding to the second frequency band through the first wireless interface and the second wireless interface.

14. The test method as claimed in claim 12, wherein the step of re-setting, by the application unit, the operation mode according to the test item when the application unit receives the execution command so that the wireless driver controls the wireless communication module to transmit the wireless signal corresponding to the operation mode comprises:
setting, by the application unit, the operation mode as a non-RSDB mode when the test item is related to the non-RSDB mode; and
executing, by the wireless driver, the non-RSDB mode, and controlling, by the wireless driver, the first wireless interface of the wireless communication module to transmit the wireless signal in a first frequency band through dual-input dual-output transmission and transmitting, by the wireless driver, an SSID corresponding to the first frequency band through the first wireless interface.

* * * * *